(12) United States Patent
Dawson et al.

(10) Patent No.: US 9,172,607 B2
(45) Date of Patent: Oct. 27, 2015

(54) TRANSMITTING OF CONFIGURATION ITEMS WITHIN A NETWORK

(75) Inventors: Christopher J. Dawson, Arlington, VA (US); Seshashayee S. Murthy, Yorktown Heights, NY (US); Rajesh Radhakrishnan, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 13/346,973

(22) Filed: Jan. 10, 2012

(65) Prior Publication Data

US 2013/0179537 A1 Jul. 11, 2013

(51) Int. Cl.
G06F 15/16 (2006.01)
H04L 12/24 (2006.01)
H04L 12/26 (2006.01)

(52) U.S. Cl.
CPC ........ H04L 41/0816 (2013.01); H04L 41/0853 (2013.01); H04L 43/0876 (2013.01)

(58) Field of Classification Search
CPC ............ H04L 41/0816; H04L 41/0853; H04L 43/0876
USPC .......... 709/217, 220, 204, 219, 223; 370/237, 370/252, 338, 351, 348
See application file for complete search history.

(56) References Cited

U.S. PATENT DOCUMENTS

| | | | |
|---|---|---|---|
| 7,228,348 B1 * | 6/2007 | Farley et al. | 709/224 |
| 7,543,058 B1 | 6/2009 | Ayachitula et al. | |
| 7,756,828 B2 | 7/2010 | Baron et al. | |
| 2004/0199579 A1 * | 10/2004 | Straw | 709/204 |
| 2005/0163088 A1 * | 7/2005 | Yamano et al. | 370/338 |
| 2006/0010486 A1 * | 1/2006 | Lu et al. | 726/4 |
| 2007/0250932 A1 | 10/2007 | Kothari | |
| 2009/0147678 A1 * | 6/2009 | Xhafa et al. | 370/232 |
| 2009/0182902 A1 | 7/2009 | Bouknight, Jr. et al. | |
| 2009/0187596 A1 | 7/2009 | Akiyama et al. | |
| 2010/0315971 A1 * | 12/2010 | Horvath et al. | 370/254 |
| 2011/0196957 A1 | 8/2011 | Ayachitula et al. | |
| 2011/0225644 A1 * | 9/2011 | Pullikottil et al. | 726/11 |
| 2012/0113860 A1 * | 5/2012 | Pollanen et al. | 370/252 |
| 2013/0007239 A1 * | 1/2013 | Agarwal et al. | 709/223 |
| 2014/0321298 A1 * | 10/2014 | Chow et al. | 370/252 |

OTHER PUBLICATIONS

Paul, C.J.; The process of building a Process Manage: Architecture and design patterns; IBM Systems Journal, vol. 46, No. 3; 2007; 479-495.

(Continued)

Primary Examiner — Thuong Nguyen
(74) Attorney, Agent, or Firm — Brown & Michaels, PC; John R. Pivnichny

(57) ABSTRACT

A method, system and program product for transmitting configuration item data by a network object within a network. The steps include the network object detecting a change; the network object detecting an amount of traffic within the network; the network object transmitting configuration item data to the network at a level based on the amount of traffic present within the network. If all of the configuration item data was not sent and the network object detects that the amount of network traffic within the network is below a determined amount, the network object transmits remaining configuration item data to the network; and if all configuration item data was sent, returns to the step of the network object detecting a change.

30 Claims, 3 Drawing Sheets

(56) References Cited

OTHER PUBLICATIONS

Cachin, C. et al.; Secure and Efficient Asynchronous Broadcast Protocols; IBM Research; 18 pages; 1999.
Ward, C. et al.; Integrated change and configuration management; IBM Systems Journal, vol. 46, No. 3; 2007; 459-478.
Brittenham, P. et al.; IT service management architecture and autonomic computing; IBM Systems Journal, vol. 46, No. 3; 2007; 565-581.
Lindquist, D. et al.; IBM Service Management Architecture; IBM Systems Journal, vol. 46, No. 3; 2007; 423-440.
Madduri, H. et al.; A configuration management database architecture in support of IBM Service Management; IBM Systems Journal, vol. 46, No. 3; 2007; 441-457.

* cited by examiner

TRANSMITTING OF CONFIGURATION ITEMS WITHIN A NETWORK

BACKGROUND

The present invention relates to the transmitting of configuration items within a network and more specifically to transmitting of configuration items and configuration data within a network based on the amount of network traffic.

To maintain the status or inventory of devices of a network within a configuration management database, commonly at a specifically requested time or at a periodic set time, an automated program is run to discover whether any devices have been added or removed from the network. The program does not collect data regarding the real time in which devices were removed or added to the network or the configuration of the devices in real time.

SUMMARY

According to one embodiment of the present invention, a method of transmitting configuration item data by a network object within a network. The method includes the steps of: the network object detecting a change; the network object detecting an amount of traffic within the network; the network object transmitting configuration item data to the network at a level based on the amount of traffic present within the network; if all of the configuration item data was not sent and the network object detects that the amount of network traffic within the network is below a determined amount, the network object transmits remaining configuration item data to the network; and if all configuration item data was sent, return to the step of the network object detecting a change.

According to another embodiment of the present invention, a computer program product for a network object for transmitting configuration item data by a network object within a network. The computer program product includes: one or more computer-readable, tangible storage devices; program instructions, stored on at least one of the one or more storage devices, to detect a change; program instructions, stored on at least one of the one or more storage devices, to detect an amount of traffic within the network; program instructions, stored on at least one of the one or more storage devices, to transmit configuration item data to the network at a level based on the amount of traffic present within the network; if all of the configuration item data was not sent and the amount of network traffic within the network is below a determined amount, program instructions, stored on at least one of the one or more storage devices, to transmit remaining configuration item data to the network; and if all configuration item data was sent, return to program instructions, stored on at least one of the one or more storage devices, to detect a change.

According to yet another embodiment of the present invention, a computer system including a network object for transmitting configuration item data by a network object within a network. The computer system including: one or more processors, one or more computer-readable memories and one or more computer-readable, tangible storage devices; program instructions, stored on at least one of the one or more storage devices, for execution by at least one of the one or more processors via at least one of the one or more memories to detect a change; program instructions, stored on at least one of the one or more storage devices, for execution by at least one of the one or more processors via at least one of the one or more memories to detect an amount of traffic within the network; program instructions, stored on at least one of the one or more storage devices, for execution by at least one of the one or more processors via at least one of the one or more memories to transmit configuration item data to the network at a level based on the amount of traffic present within the network; if all of the configuration item data was not sent and the amount of network traffic within the network is below a determined amount, program instructions, stored on at least one of the one or more storage devices, for execution by at least one of the one or more processors via at least one of the one or more memories to transmit remaining configuration item data to the network; and if all configuration item data was sent, return to program instructions, stored on at least one of the one or more storage devices, for execution by at least one of the one or more processors via at least one of the one or more memories to detect a change.

DETAILED DESCRIPTION

Figure 1:
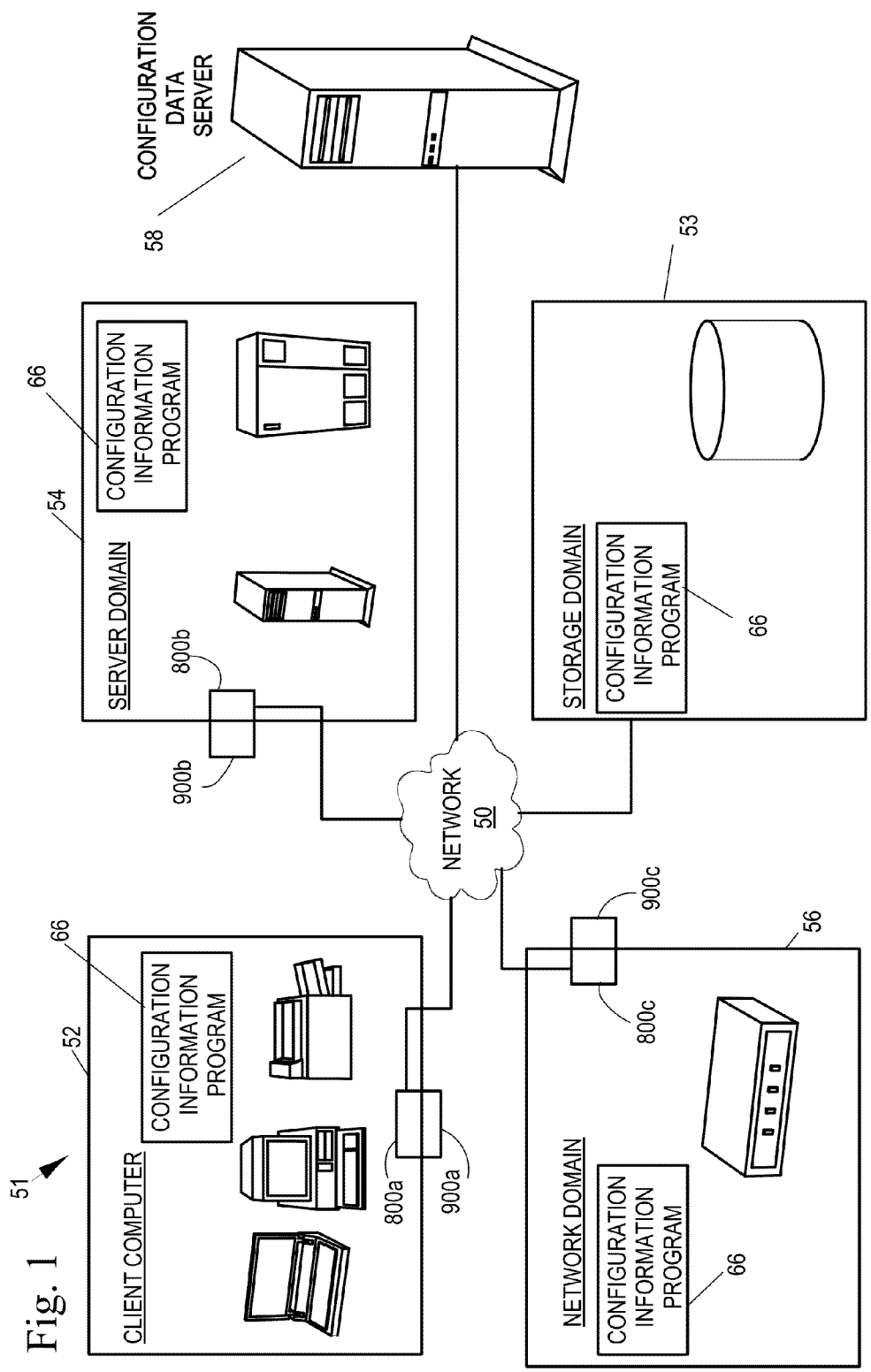
FIG. 1 depicts a pictorial representation of a network of computers in which illustrative embodiments may be implemented

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a personal computing domain 52, a server domain 54, a storage domain 53, and a network domain 56 connect to network 50, as well as a configuration data server 58. In other exemplary embodiments, network data processing system 51 may include additional domains, each with additional client computers, storage devices, server computers, and other devices not shown.

Figure 3:
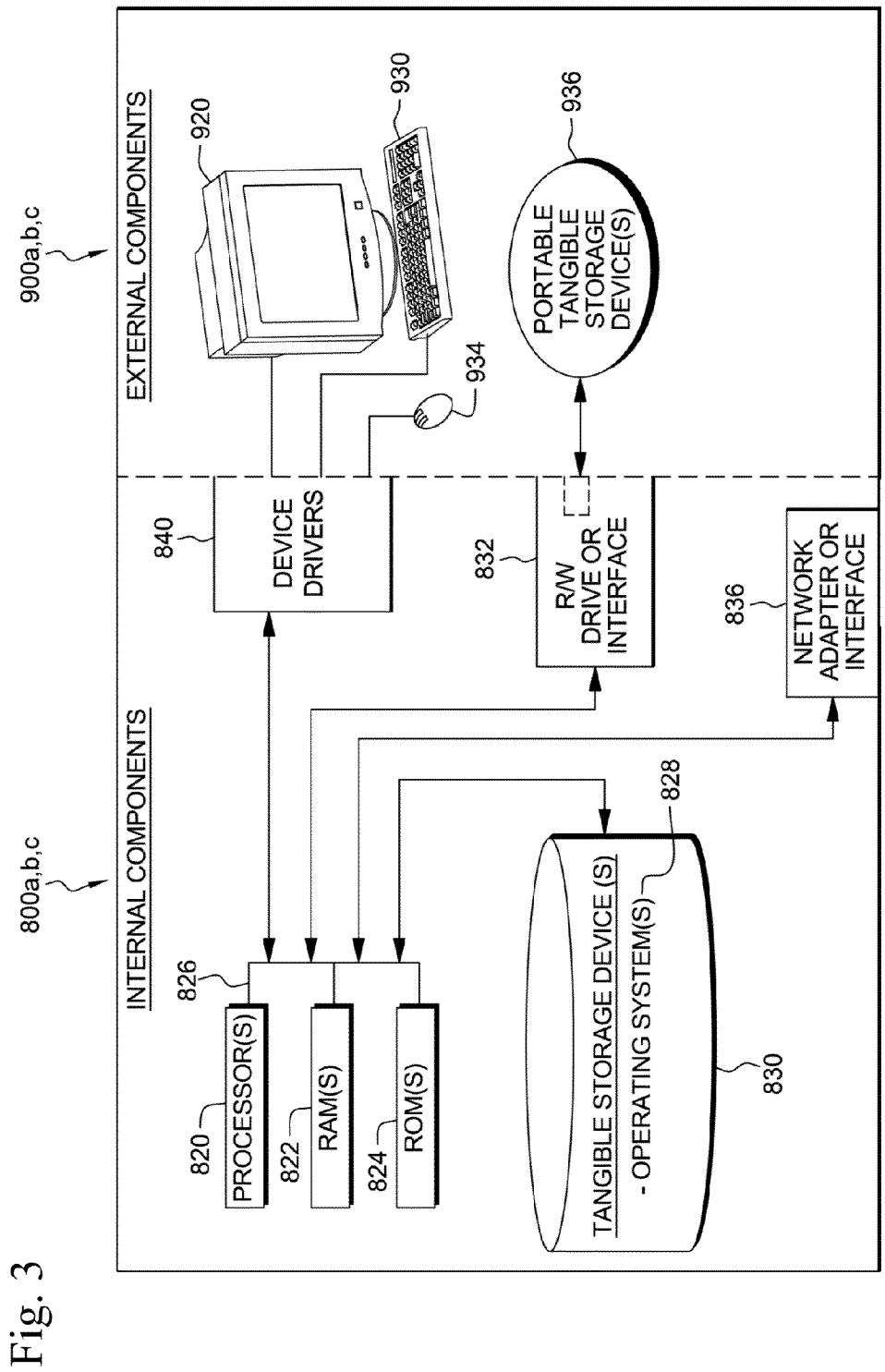
FIG. 3 shows illustrates internal and external components of a client computer and a server computer in which illustrative embodiments may be implemented.

The personal computing domain 52 includes network objects or devices such as client computers and other devices that include a set of internal components 800a and a set of external components 900a, further illustrated in FIG. 3. The network objects or devices within the personal computing domain 52 may be, for example, a mobile device, a cell phone, a personal digital assistant, a netbook, a laptop computer, a tablet computer, a desktop computer, or any other type of computing device. The network objects or devices within the personal computing domain 52 may have an interface which can be, for example, a command line interface, a graphical user interface (GUI), or a web user interface (WUI) through which a user can access other devices on the network 50 within the server domain 54, network domain 56, storage domain, or configuration data server 58. The network objects or devices within the server domain 54 and the network domain 56 includes a set of internal components 800b, 800c and a set of external components 900b, 900c illustrated in FIG. 3.

In the depicted example, the network objects or devices within the server domain 54 provide information, such as boot files, operating system images, and applications to network objects or devices, such as a client computer within the personal computing domain 52. Network objects or devices within the server domain 54, such as a server or mainframe can compute the information locally or extract the information from other computers on network 50.

Program code and programs such as a configuration information program 66 may also be located on the network objects or devices within the personal computing domain 52, the network objects or devices within the network domain 56, the network objects or devices within the server domain 54 of the network data processing system 51 and may be stored on at least one of one or more computer-readable tangible storage devices, which may be for example at least one of one or more portable computer-readable tangible storage devices 936 as shown in FIG. 3 within the storage domain 53, or downloaded to a data processing system or other device for use. It should be noted that while the configuration information program 66 is shown as being within the domains, for example the personal computing domain 52, the network domain 56, the server domain 54, and the storage domain 53, the configuration information program 66 is preferably present on the devices within those domains.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

In one embodiment, configuration items (CI) of network objects or devices are securely transmitted within a network to a configuration data server, for example with a configuration management information system (CMIS) to identify new configuration items based on when they enter the network, identify when devices leave the network, or which devices have had a change in configuration in real time, allowing for verification, validation and reconciliation of a change of configuration item data within the network. The CI data sent is compliant with a data model, such as a common information model (CIM) which defines how the objects within the network and the interconnectivity of or relationships between those network objects within the network. The data model used may be technology domain specific and leverage existing data models, and is compatible with the CMIS.

It should be noted that any network object or device with an Internet Protocol (IP) address may transmit CI data within a network. Subnet topology may also be transmitted within the network to a configuration data server. For example, if a fabric switch was introduced to multiple storage area network (SAN) devices, the SAN devices can broadcast CI data regarding the SAN fabric switch to the configuration data server.

It should be noted that the term "transmit" as used within the application encompasses both broadcasting of configuration item data within the network, in which there is no designated recipient and multicasting of configuration item data within the network, in which there are multiple designated recipients.

In another embodiment, the CI data may be multicast to specified subnets or management nodes within a network. Alternatively, the CI data may only be multicast when a network object or device self detects configuration changes or configuration changes to the system in which it is connected to.

Figure 2:
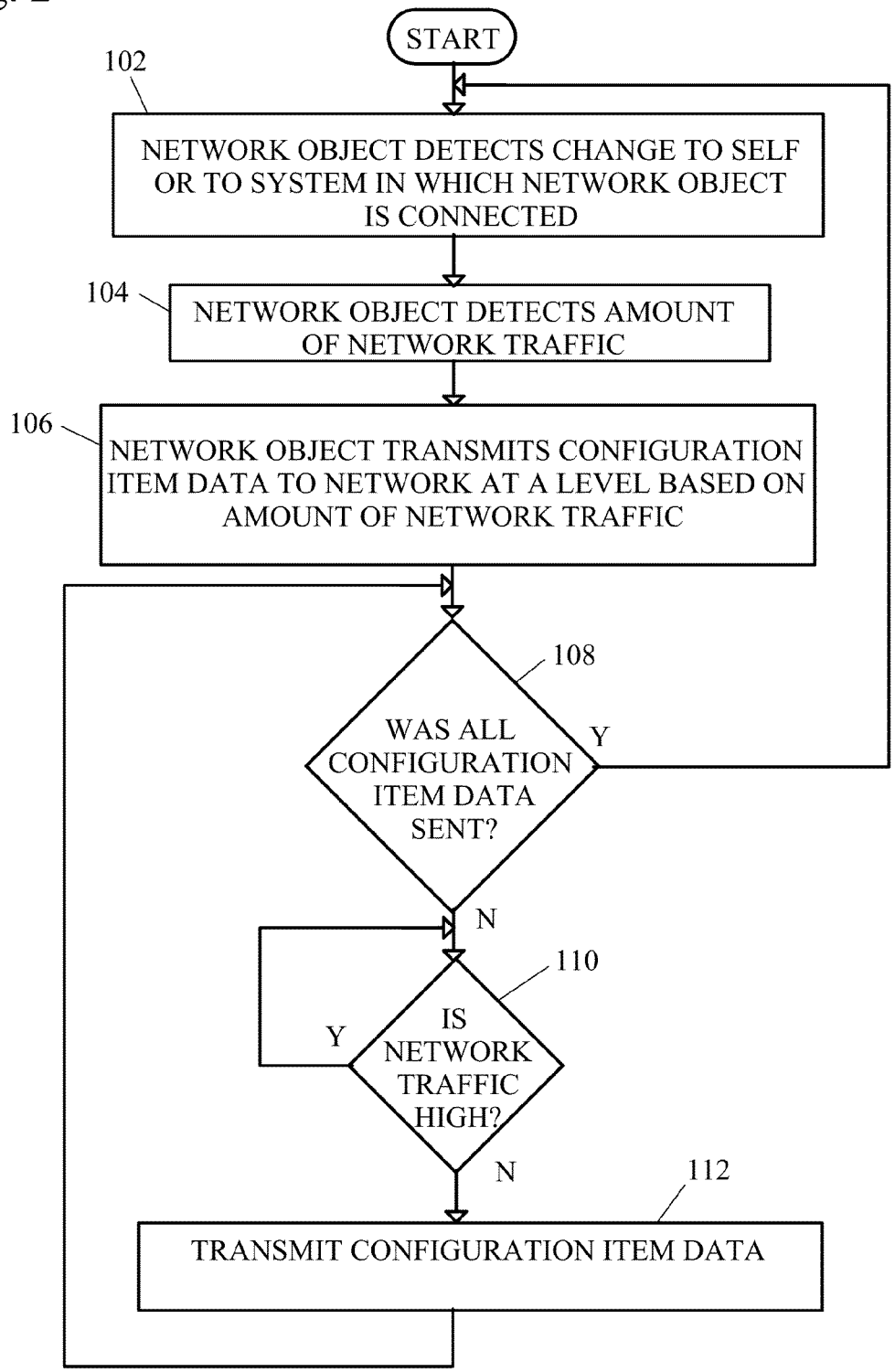
FIG. 2 shows a method of transmitting configuration items within a network.

Referring to FIG. 2, a network object detects a change to itself or to the domain/system in which the network object is connected (step 102). The change may be detected by the device through a configuration information program 66 that utilizes a transmit protocol specifically calibrated for automated discovery, such as dynamic component configuration broadcast protocol. The changes to the device are detected real time within the network. The change may be to a sub-network within a domain, for example adding a printer to personal computer within the personal computing domain 52 or the addition of server or a repository to the network 50.

The network object detects the amount of traffic within the network (step 104). The network objects may detect traffic within the network or the configuration data server 58 may return the amount of traffic to the network object.

The network object then transmits configuration item data to the network at an information level that corresponds to the network traffic (step 106). The configuration item data sent is compliant with a data model that is present on the configuration data server 58. The configuration item data may be broken down into CI data level standards based on CI classification standards, with the least amount of information being sent during high network traffic and an increased amount of granularity of information being sent during low network traffic. The classification standards may be CI vendor specific, client organization specific, or industry standard, such as Distributed Management Task Force, Inc. (DMTF) common information model (CIM). Furthermore, the CI classification standards may be customized for the individual domains within the system itself, given precedence to a specific domain over others to broadcast information during high network traffic.

For example, a server operating system within the server domain 54 can send configuration data such as the IP address and Operating System Version during high network traffic, for example corresponding to a level one of configuration item data sent to the configuration data server 58. Level two of configuration item data sent may include IP Address, Operating System, Patch Level, and Number of Virtual Server Hosts. Level three of configuration item data may include IP Address, Operating System, Patch Level, Number of Virtual Server Hosts, Types of Virtual Servers Hosted, and the File System Structure and size of each. Level four of configuration item data may include IP Address, Operating System, Patch Level, Number of Virtual Server Hosts, Types of Virtual Servers Hosted, the File System Structure and size of each, and whether an image of the operating system and virtual servers is present and if so, the name of the image and the location. The most detailed information could also include data documenting relationships of the server to other network objects—for example, the server could report the IP addresses of devices it is connected directly to (i.e. in only one hop).

If all of the configuration item data was sent to the network (step 108), then the method ends.

If all of the configuration item data was not sent to the network (step 108), and network traffic is low (step 110), then the network object or device transmits the remaining configuration item data to the network (step 112). For example if only level one of configuration item data was broadcasted to the network, the remaining data present (levels two through four) would then be sent to the network. The remaining levels may be sent at the same time, (e.g. two through four), or one level would be sent at time (e.g. level 2), and the state of the network traffic rechecked before sending a next level (e.g. level 3). The method in which the remaining data levels are sent may be customized for each domain and may be altered as necessary, for example during incident or problem management.

It should be noted that data that was already initially sent is not resent during low traffic periods.

If all of the configuration item data was not sent to the network (step 108) and the network traffic is high, (step 110), return to step 110 of checking the network traffic for volume.

Once the configuration item data is transmitted to the network, the configuration data server 58 receives the configuration item data and stores the data in a database, such as a configuration management database (CMDB) with a configuration management information system (CMIS) for direct control over the information technology assets including identification of network objects, control of network objects, and status accounting of the network objects and verification of the network objects. By having network objects or devices transmit, through broadcasting or multicasting CI data to the network, the impact of changes to the network are minimized since they occur real time and do not accumulate between time periods in which an automated program is run. Therefore, the CMIS receives accurate, real time information regarding CIs, and improves security by controlling the versions of CIs in use. Furthermore, multicasting of CIs allows the CMIS to facilitate adherence to legal obligations, such as the Sarbanes-Oxley Act (SOX) and aid in financial and expenditure planning since redundancy is improved and resources are scaled.

FIG. 3 illustrates internal and external components of devices within a personal computing domain 52, and devices within a server domain 54 in which illustrative embodiments may be implemented. Some of the devices within the network domain 56 may also have the internal and external components illustrated in FIG. 3. In FIG. 3, devices within the personal computing domain 52 and server domain 54, as well as some devices within the network domain 56 include respective sets of internal components 800a, 800b, 800c and external components 900a, 900b, 900c. Each of the sets of internal components 800a, 800b, 800c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 are stored on one or more of the computer-readable tangible storage devices 830 for execution by one or more of the processors 820 via one or more of the RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Furthermore, the devices within the storage domain 53 may also include computer-readable tangible storage devices, such as computer-readable tangible storage devices 830. Alternatively, each of the computer-readable tangible storage devices may be a semiconductor storage device such as ROM 824, EPROM, flash memory or any other computer-readable tangible storage device that can store a computer program and digital information.

Each set of internal components 800a, 800b, 800c also includes a R/W drive or interface 832 to read from and write to one or more portable computer-readable tangible storage devices 936 such as a CD-ROM, DVD, memory stick, magnetic tape, magnetic disk, optical disk or semiconductor storage device. A configuration information program 66 can be stored on one or more of the portable computer-readable tangible storage devices 936, read via R/W drive or interface 832 and loaded into hard drive 830.

Each set of internal components 800a, 800b, 800c also includes a network adapter or interface 836 such as a TCP/IP adapter card. A configuration information program 66 can be downloaded to computer within the personal computing domain 52 and server computer within the server domain 54 from an external computer via a network (for example, the Internet, a local area network or other, wide area network) and network adapter or interface 836. From the network adapter or interface 836, configuration information program 66 is loaded into hard drive 830. The network may comprise copper wires, optical fibers, wireless transmission, routers, firewalls, switches, gateway computers and/or edge servers.

Each of the sets of external components 900a, 900b, 900c includes a computer display monitor 920, a keyboard 930, and a computer mouse 940. Each of the sets of internal components 800a, 800b also includes device drivers 840 to interface to computer display monitor 920, keyboard 930 and computer mouse 940. The device drivers 840, R/W drive or interface 832 and network adapter or interface 836 comprise hardware and software (stored in storage device 830 and/or ROM 824).

A configuration information program 66 can be written in various programming languages including low-level, high-level, object-oriented or non object-oriented languages. Alternatively, the functions of a configuration information program 66 can be implemented in whole or in part by computer circuits and other hardware (not shown).

Based on the foregoing, a computer system, method and program product have been disclosed for a method of transmitting configuration items within a network. However, numerous modifications and substitutions can be made without deviating from the scope of the present invention. Therefore, the present invention has been disclosed by way of example and not limitation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of transmitting by a device within a network interconnecting a plurality of devices, a plurality of items of configuration data regarding a change in configuration of a device connected to the network, each item of configuration data being associated with one of a plurality of information levels, the information levels being ordered by a number of items of configuration data associated with the information level, comprising the steps of:

a first device within the network detecting a change in configuration to a second device connected to the network, wherein the change in configuration to the second device comprises at least an addition of the second device to the network, and the change in configuration to the second device generates at least one item of configuration data corresponding to the detected change of the second device in real time, wherein the at least one item of configuration data is associated with at least one information level, the information levels varying by number of included items of configuration data;

the first device within the network, detecting an amount of traffic within the network and whether the amount of traffic within the network is below at least one determined amount;

the first device determining what information level and items of configuration data are to be transmitted to the network based on the detected amount of traffic within the network, such that the information level and the number of items of configuration data transmitted is greater in number when the amount of network traffic is below the at least one determined amount, and that the number of items of configuration data transmitted is inversely related to the amount of traffic detected by the first device within the network;

the first device determining whether an information level and items of configuration data associated with the information level have already been transmitted within the network regarding the detected change in configuration to the second device;

if none of the items of configuration data regarding the detected change of the second device were transmitted by the first device to the network, the first device within the network transmitting the most number of items of configuration data associated with information levels regarding the detected change based on the network traffic;

if all of the items of configuration data regarding the detected change of the second device were not transmitted by the first device to the network, and the amount of network traffic within the network is below the at least one determined amount, the first device within the network transmitting items of configuration data regarding the detected change of the second device and associated with information levels which were not previously transmitted to the network; and if all of the items of configuration data regarding the detected change of the second device were transmitted to the network, return to the step of the first device within the network detecting the change in configuration.

2. The method of claim 1, wherein the change detected by the first device within the network is in a domain in which the second device within the network is connected.

3. The method of claim 1, wherein the network transmits configuration data to at least one subnet within the network.

4. The method of claim 1, wherein the configuration data includes data documenting relationships of the second device within the network to other devices within the network.

5. The method of claim 1, in which the first device transmitting within the network comprises broadcasting the at least one item of configuration data to the network.

6. The method of claim 1, in which the first device transmitting within the network comprises multicasting the at least one item of configuration data to a plurality of devices within the network.

7. The method of claim 1, wherein the items of configuration data not previously transmitted are transmitted to the network level by level.

8. The method of claim 1, wherein all of the items of the configuration data not previously transmitted are transmitted to the network.

9. The method of claim 1, wherein items of configuration data in a first level comprise at least an IP address and operating system version of the second device.

10. The method of claim 9, wherein items of configuration data in a second level comprise at least: all of the items of the first level, patch level and number of virtual server hosts of the second device.

11. The method of claim 10, wherein items of configuration data in a third level comprise at least: all of the items of the first level, all of the items of the second level, types of virtual servers hosted, file system structure, and size of the file system structure of the second device.

12. The method of claim 11, wherein items of configuration data in a fourth level comprise at least: all of the items of the first level, all of the items of the second level, all of the items of the third level, an image of the operating system, virtual servers present of the second device and relationships between the second device and other network objects.

13. A computer program product comprising one or more computer-readable, tangible storage devices and computer-readable program instructions which are stored on the one or more storage devices and when executed by one or more processors, performing all the steps of claim 1.

14. A computer system comprising one or more processors, one or more computer-readable memories, one or more computer-readable, tangible storage devices and program instructions which are stored on the one or more storage devices for execution by the one or more processors via the one or more memories and when executed by the one or more processors perform all the steps of claim 1.

15. A computer program product for transmitting by a device within a network interconnecting a plurality of devices, a plurality of items of configuration data regarding a change in configuration of a device connected to the network, each item of configuration data being associated with one of a plurality of information levels, the information levels being ordered by a number of items of configuration data associated with the information level, the computer program product comprising:

one or more computer-readable, tangible storage devices;

program instructions, stored on at least one of the one or more storage devices, for a first device within the network to detect a change in configuration to a second device connected to the network, wherein the change in configuration to the second device comprises at least an addition of the second device to the network, and the change in configuration to the second device generates at least one item of configuration data corresponding to the detected change of the second device in real time, wherein the at least one item of configuration data is associated with at least one information level, the information levels varying in number of included items of configuration data;

program instructions, stored on at least one of the one or more storage devices, for the first device within the network to detect an amount of traffic within the network and whether the amount of traffic within the network is below at least one determined amount;

program instructions, stored on at least one of the one or more storage devices, for the first device to determine what information level and items of configuration data are to be transmitted to the network based on the detected amount of traffic within the network, such that the information level and the number of items of configuration data transmitted is greater in number when the amount of network traffic is below the at least one determined amount, and that the number of items of configuration data transmitted is inversely related to the amount of traffic detected by the first device within the network;

program instructions, stored on at least one of the one or more storage devices, for the first device to determine whether an information level and associated items of configuration data associated with the information level have already been transmitted within the network regarding the detected change in configuration to the second device;

if none of the items of configuration data regarding the detected change of the second device were transmitted by the first device to the network, program instructions, stored on at least one of the one or more storage devices, for the first device within the network to transmit the most number of items of configuration data associated with information levels regarding the detected change based on the network traffic;

if all of the items of configuration data regarding the detected change of the second device were not transmitted by the first device, and the amount of network traffic within the network is below the at least one determined amount, program instructions, stored on at least one of the one or more storage devices, for the first device within the network to transmit items of configuration data associated within information levels which were not previously transmitted to the network; and if all of the items of configuration data were transmitted to the network, return to program instructions, stored on at least one of the one or more storage devices, for the first device within the network to detect the change in configuration.

16. The program product of claim 15, wherein the change detected by the first device within the network is in a domain in which the second device within the network is connected.

17. The computer program product of claim 15, wherein the network transmits configuration data to at least one subnet within the network.

18. The computer program product of claim 15, wherein the configuration data includes data documenting relationships of the second device within the network to other devices within the network.

19. The computer program product of claim 15, in which the program instructions stored on at least one of the one or more storage devices, for the first device within the network to transmit comprises broadcasting the at least one item of configuration data to the network.

20. The computer program product of claim 15, in which the program instructions stored on at least one of the one or more storage devices, for the first device within the network to transmit within the network comprises multicasting the at least one item of configuration data to a plurality of network objects within the network.

21. The computer program product of claim 15, wherein the items of configuration data not previously transmitted are transmitted to the network level by level.

22. The computer program product of claim 15, wherein all of the items of configuration data not previously transmitted are transmitted to the network.

23. A computer system for transmitting by a device within a network interconnecting a plurality of devices, a plurality of items of configuration data regarding a change in configuration of a device connected to the network, each item of configuration data being associated with one of a plurality of information levels, the information levels being ordered by a number of items of configuration data associated with the information level, the computer system comprising:

one or more processors, one or more computer-readable memories and one or more computer-readable, tangible storage devices;

program instructions, stored on at least one of the one or more storage devices, for execution by at least one of the one or more processors via at least one of the one or more memories for a first device within the network to detect a change in configuration to a second device connected to the network, wherein the change in configuration to the second device comprises at least an addition of the second device to the network, and the change in configuration to the second device generates at least one item of configuration data corresponding to the detected change of the second device in real time, wherein the at least one item of configuration data is associated with at least one information level, the information levels varying number of included items of configuration data;

program instructions, stored on at least one of the one or more storage devices, for execution by at least one of the one or more processors via at least one of the one or more memories for the first device within the network to detect an amount of traffic within the network and whether the amount of traffic within the network is below at least one determined amount;

program instructions, stored on at least one of the one or more storage devices, for execution by at least one of the one or more processors via at least one of the one or more memories for the first device to determine what information level and items of configuration data are to be transmitted to the network based on the detected amount of traffic within the network, such that the information level and the number of items of configuration data transmitted is greater in number when the amount of network traffic is below the at least one determined amount, and that the number of items of configuration data transmitted is inversely related to the amount of traffic detected by the first device within the network;

program instructions, stored on at least one of the one or more storage devices, for execution by at least one of the one or more processors via at least one of the one or more memories for the first device to determine whether an information level and items of configuration data associated with the information level have already been transmitted within the network regarding the detected change in configuration to the second device;

if none of the items of configuration data regarding the detected change of the second device were transmitted by the first device to the network, program instructions, stored on at least one of the one or more storage devices, for execution by at least one of the one or more processors via at least one of the one or more memories for the first device within the network to transmit the most number of items of configuration data associated with information levels regarding the detected change based on the network traffic;

if all of the items of configuration data regarding the detected change of the second device were not transmitted by the first device, and the amount of network traffic within the network is below the at least one determined amount, program instructions, stored on at least one of the one or more storage devices, for execution by at least one of the one or more processors via at least one of the one or more memories for the first device within the network to transmit items of configuration data associated within information levels which were not previously transmitted to the network; and if all of the items of configuration data were transmitted to the network, return to program instructions, stored on at least one of the one or more storage devices, for execution by at least one of the one or more processors via at least one of the one or more memories for the first device within the network to detect the change in configuration.

24. The computer system of claim 23, wherein the change detected by the first device within in the network is in a domain in which the second device within the network is connected.

25. The computer system of claim 23, wherein the network transmits configuration data to at least one subnet within the network.

26. The computer system of claim 23, wherein the configuration data includes data documenting relationships of the second device within the network to other devices within the network.

27. The computer system of claim 23, in which the program instructions, stored on at least one of the one or more storage devices, for execution by at least one of the one or more processors via at least one of the one or more memories for the first device within the network to transmit comprises broadcasting the at least one item of configuration data to the network.

28. The computer system of claim 23, in which the program instructions, stored on at least one of the one or more storage devices, for execution by at least one of the one or more processors via at least one of the one or more memories for the first within the network device to transmit comprises multicasting the at least one item of configuration data to a plurality of network objects within the network.

29. The computer system of claim 23, wherein the items of configuration data not previously transmitted are transmitted to the network level by level.

30. The computer system of claim 23, wherein all of the items of configuration data not previously transmitted are transmitted to the network.

\* \* \* \* \*